P. KUHNE.
RADIATOR FOR MOTOR VEHICLES.
APPLICATION FILED JUNE 10, 1918. RENEWED JUNE 22, 1921.
1,417,466.
Patented May 23, 1922.
4 SHEETS—SHEET 1.
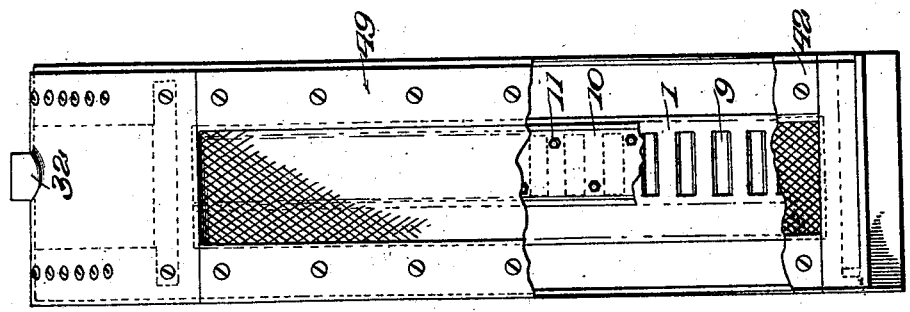
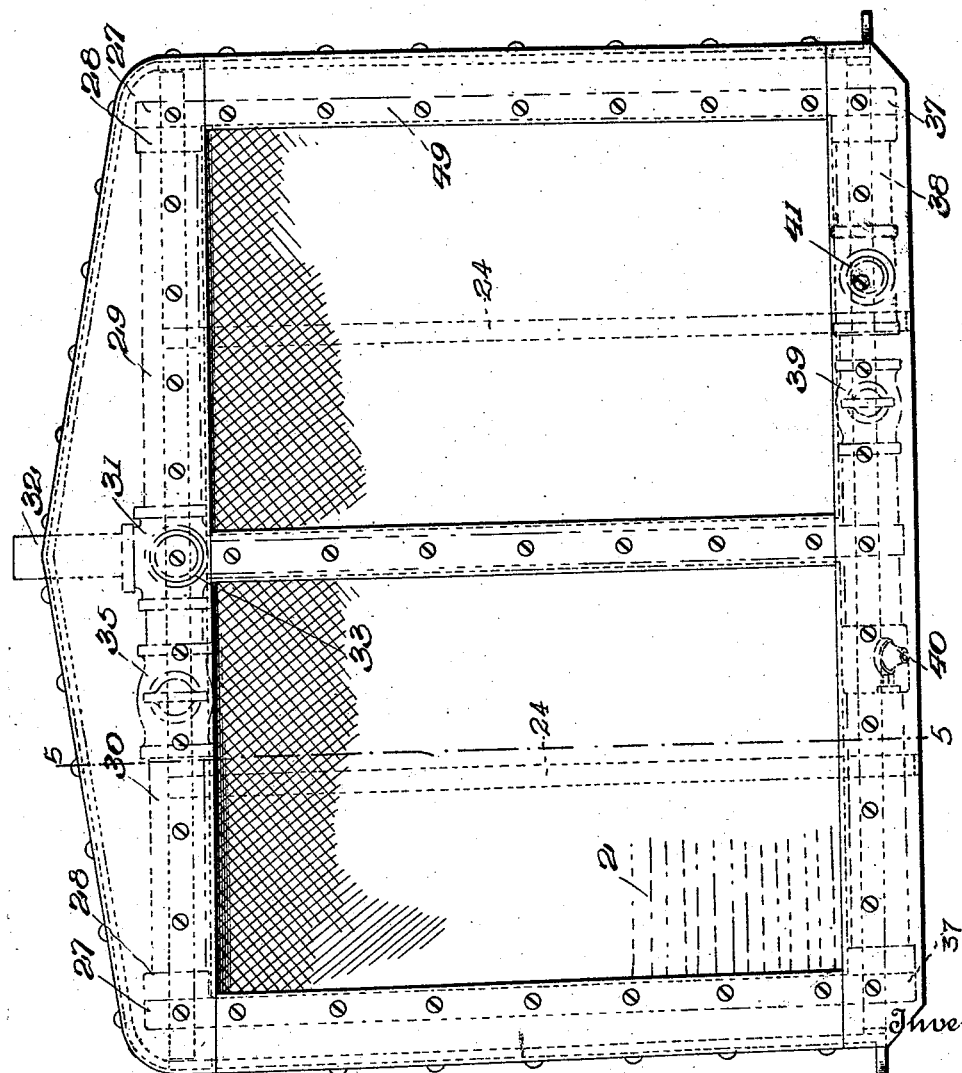
Inventor
Paul Kuhne.
By J. J. Geisler
Attorney

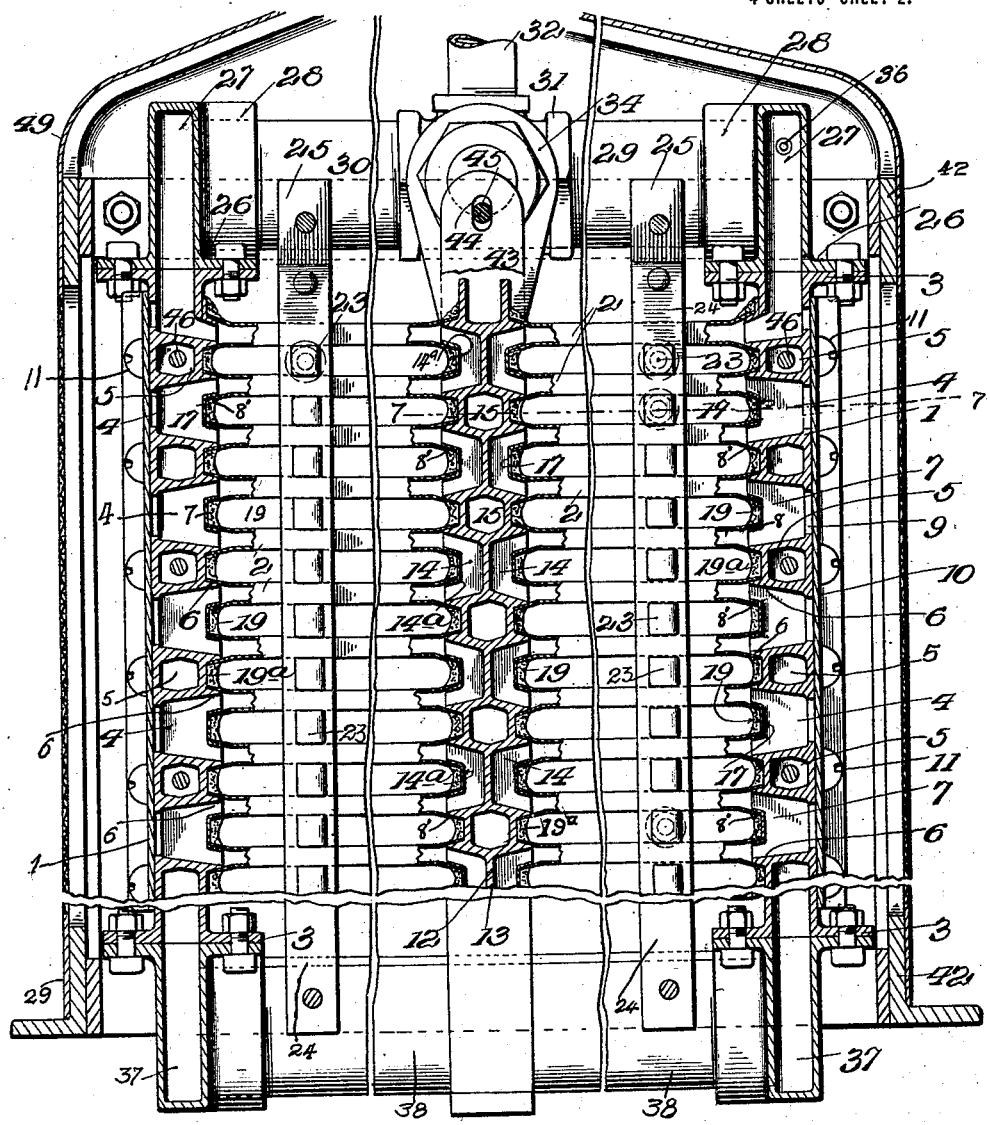
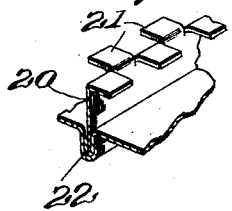

P. KUHNE.
RADIATOR FOR MOTOR VEHICLES.
APPLICATION FILED JUNE 10, 1918. RENEWED JUNE 22, 1921.
1,417,466.
Patented May 23, 1922.
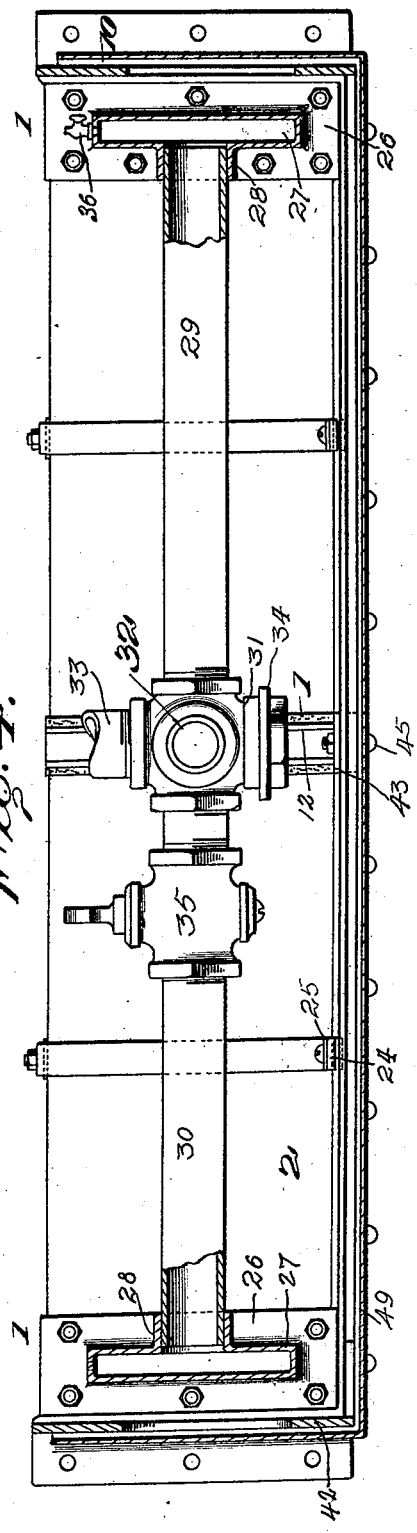
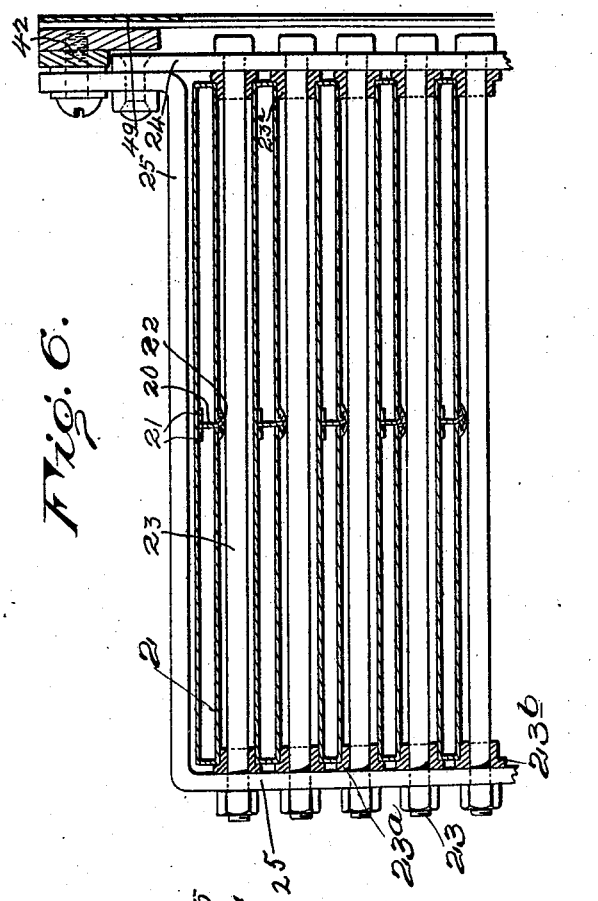
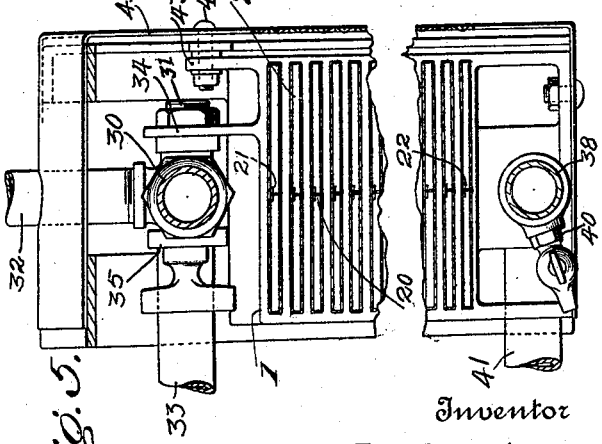

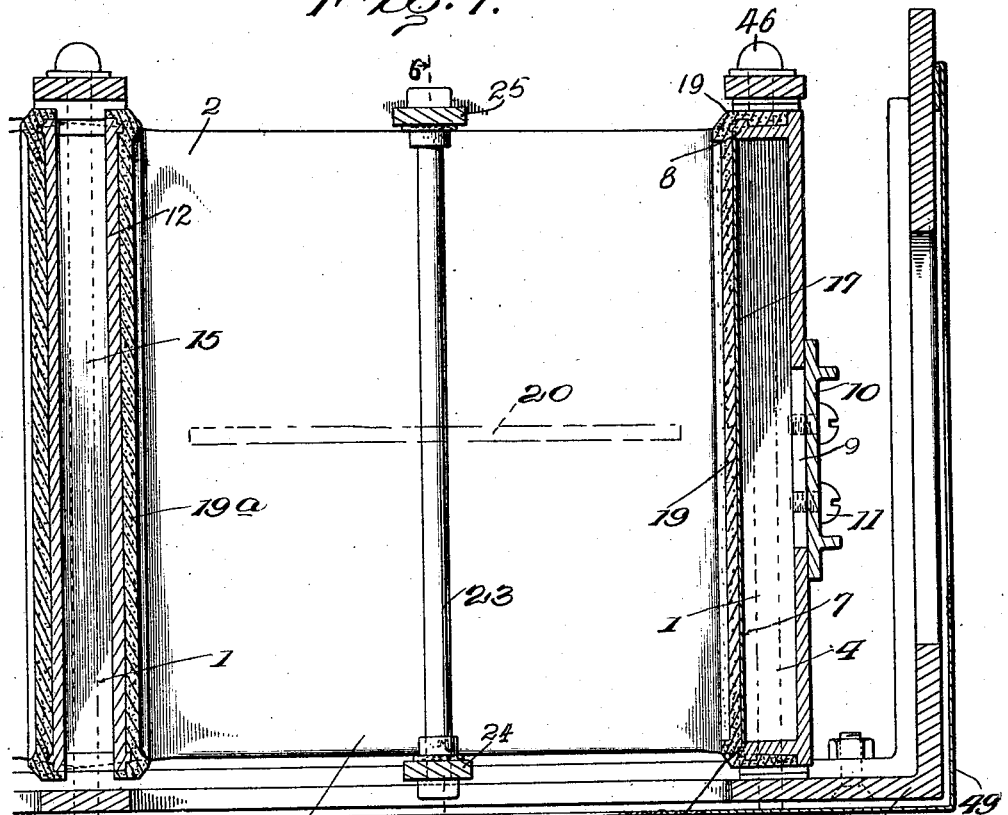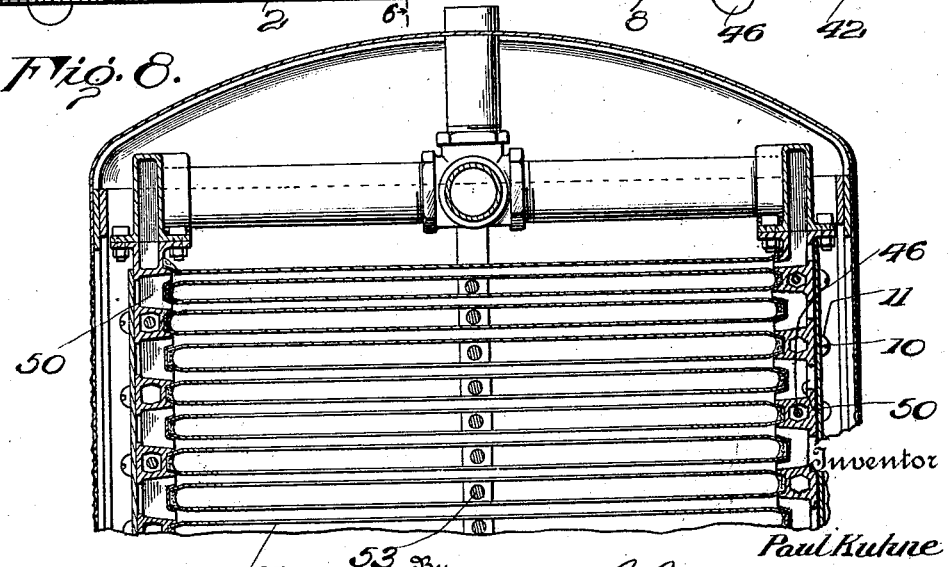

UNITED STATES PATENT OFFICE.

PAUL KUHNE, OF CHICAGO, ILLINOIS, ASSIGNOR OF ONE-HALF TO WERNER KUHNE, OF BIRMINGHAM, ALABAMA.

RADIATOR FOR MOTOR VEHICLES.

1,417,466. Specification of Letters Patent. Patented May 23, 1922.

Application filed June 10, 1918, Serial No. 239,201. Renewed June 22, 1921. Serial No. 479,707.

*To all whom it may concern:*

Be it known that I, PAUL KUHNE, a citizen of the United States of America, residing at Chicago, in the county of Cook and State of Illinois, have invented certain new and useful Improvements in Radiators for Motor Vehicles, of which the following is a specification.

My invention relates to improvements in radiators for motor vehicles.

One of the primary objects of this invention is to provide increased cooling surface to insure of the water being maintained at the proper temperature.

A further object of the invention is to provide improved means for conveniently and economically assembling the parts, and to afford ready means for cleaning the water conduit.

It is highly important that the water conduit be of such construction as to be subjected to as much of the air as possible, and to this end I provide spaced thin flat transverse tubular members, the sides of which are at all times exposed to the air currents passing through the radiator.

In addition to the foregoing objects, my invention comprehends improvements in the details of construction and arrangements of parts which will be hereafter described and particularly pointed out in the claims.

In the accompanying drawings:—

Fig. 1 is a front elevation of my improved radiator, parts being broken away,

Fig. 2 is an end elevation of the same, parts being broken away,

Fig. 3 is an enlarged view of the radiator looking from the front, the outer casing and the end heads being in section, Fig. 4 is a plan view, parts being broken away and in section, Fig. 5 is a vertical section on the line 5 of Fig. 1, parts being broken away, Fig. 6 is an enlarged detail vertical section on the line 6—6 of Fig. 7, to illustrate the construction of the tubular members and their supports, Fig. 7 is an enlarged detail horizontal section on the line 7—7 of Fig. 3, Fig. 8 is a detail transverse section on an enlarged scale to illustrate a different arrangement of the invention.

Fig. 9 is a detail perspective view of a portion of one of the reinforcing ribs for the tubular members.

The water conduit of the present invention includes essentially vertical heads 1, and horizontal tubular members 2, rectangular in cross section. Referring particularly to Figures 1 to 7, there are three vertical heads shown, one on each side, and one in the center of the radiator, and I will therefore first describe this form of the invention.

Each vertical side or end head comprises a standard formed at opposite ends with flanges 3, and with spaced apart ports 4, and between the latter are formed openings 5, through which air currents pass. The ports between the top and bottom ports are formed substantially U-shaped, and the metal is inwardly extended to form flanges 6. Between adjacent flanges 6, is formed a depression 7, having end flanges 8. The outer wall of each head is provided with cleaning openings 9, in alignment with the ports 4, and covering the openings in each head is a detachable plate 10, fastened by screws or the like 11.

The center head comprises a standard 12, formed on opposite sides of a middle rib 13, with ports 14, of exactly the same shape and construction as the ports 4, and between said ports 14, the standard is provided with openings 15 for the passage of air currents and between the inlets and outlets of adjacent ports are depressions 14ª. The inlets of ports 14, are in alignment with the outlets of ports 4, in the end heads, while the outlets of said ports 14, are in alignment with the inlets of said ports 4.

Communicating with the outlets of ports 4, of the end standards and the inlets of ports 14, and with the outlets of the latter and the inlets of the former are the wide tubular members 2. These members are rectangular in cross section and form one of the essential features of the water conduit. The ends of the tubular members are flared and fit over the bevelled surfaces of the flanges 6 adjacent the ports. A trough shape section 17 is fitted in each depression 7 formed between adjacent flanges 6 in the standard, and engages the flanged ends 8' of the adjacent members 2, to form a suitable connection for the ends of the tubular members, and to provide the inlets and outlets for the respective ports. The ends of the troughs snugly fit in the flanges 8, to brace and hold the structure in position. Solder indicated at 19, is poured into the troughs 17, and around the ends, to seal the joints at the juncture of the inlets and outlets of the ports 4 and 14, and solder indicated at 19ª is applied to the joints between the ends of the tubular member and the flanges on the central head 12.

Obviously when the parts thus far described are assembled, a continuous circuitous conduit is formed on each side of the center head, which affords a long and exposed path of travel for the water then passing through the radiator.

As the members 2 are formed of thin sheet metal, and are of considerable length it is necessary to provide suitable means to prevent sagging. To this end each section is provided with an interior vertical rib 20, provided with lateral wings 21, soldered to the inner surfaces of the members, and its lower end is crimped with the metal forming members and is then meshed and soldered to seal the joint and form an outer bottom bearing flange 22. The flanges 22, rest on the top of bolts 23, which pass between the members 2, intermediate the end and center heads, and are fastened in a front frame bar 24, and a rear frame bar 25. Bolted to the top flanges 3, of the end heads are flanges 26, of hollow caps 27, each having a flanged inner opening 28. Screwed into the flanged openings 28, are pipe sections 29 and 30, and at their inner ends these sections are connected by a coupling 31, from which extends a pipe 32 to supply the radiator with water, and a circulating pipe 33, which leads to the water jacket of the engine. From the front of the coupling extends a threaded boss 31 which passes through an opening formed in a flange 34, which extends upwardly from the center head. A nut is screwed on the boss to fasten the flange and the coupling together to form a rigid structure.

In the pipe section 30, is a cut off valve 35, and in the hollow cap adjacent said section is an air vent valve 36.

To the lower flanges 3, of the end heads are bolted hollow caps 37, each formed with a flanged opening, in which fit the ends of a pipe 38, which passes freely through an opening formed in the standard of the center head. The pipe 38, is provided with a cut off valve 39, and a drain cock 40, and extending from said pipe is a circulating pipe 41, which leads to the water jacket of the engine.

Surrounding the heads is an open frame 42, to the rear upper portion of which is bolted the bars 24 and 25.

From the center head extends a flange 43, formed with an elongated slot 44, through which a bolt 45, extends to the frame. Also connecting the front and rear members of the frame and extending through the openings 5 are bolts 46. All the connecting bolts pass freely through the openings to allow for contraction and expansion, and yet the parts are so arranged as to form a rigid structure.

On the bolts 23 are resilient cushions in the form of washers 23ª, which snugly fit between adjacent tubular members. These cushions are provided with flanges 23ᵇ which fit in the spaces between the frame bars and the tubular members. The cushions are for the purpose of preventing vibration and consequent rattling of the parts.

Outside the frame 42, is an open finishing frame 49, and in the open portions thereof is an ornamental screen structure to give to the radiator a neat outward appearance and protection against injury. In Fig. 7, the frame 49, is shown spaced from the frame 42 for clearness.

For small vehicles, it is not necessary to provide an intermediate head, the rigidity of the metal being sufficient to resist liability of sagging when short sections are employed. This form of the invention is disclosed in Figure 8. The end heads, indicated at 50, are exactly of the same construction as those previously described, and the tubular members 51, connect directly to and communicate with the ports in said heads. In this embodiment of my invention the tubular members are supported intermediate their length by bolts 53, which are supported in the frame. In other respects the construction is the same as that previously described.

In operation, the water from the jacket of the engine enters the circulating pipe 33, and passes through the pipe sections 29 and 30, to the caps 27, and then flows through the ports in the end heads, and thence through the tubular members, through the ports in the center head, and so on until the lower pipe 38, is reached. The water is then pumped through pipe 41 back to the water jacket. Obviously the water follows a long circuitous path in flowing from the top to the bottom of the radiator. Not only does the water follow a circuitous path, but from the time it enters the first tubular member until it reaches the bottom pipe it flows through a thin restricted area, as compared to the area of the circulating pipes. As the tubular members are thin in cross section, and are spaced apart, the air in passing through the spaces cools the surfaces of the sides of each tube, which effectually acts to reduce the temperature of the water.

If the tubular members should become dirty, the frame 42 can be removed, and by removing the bolts 11, the cover plates 10, can be detached, and a cleaning tool inserted through the ports. By this arrangement the tubular members can be quickly and conveniently cleaned to afford proper circulation of the water.

If when using the form of invention shown in Figures 1 to 7, it may be found desirable to cut out a section of the radiator, the valve 35 and the valve in the pipe 38, are closed. In this way the circulation will be through pipe section 29, and the tubular members on one side the center head to the circulating pipe 38.

What I claim is:—

1. A radiator of the class described comprising two vertical end heads formed with a plurality of ports having inlet and outlet openings, a plurality of thin flat tubular members connecting the inlets of one head and the outlets of the opposite head, a longitudinal re-inforcing rib in each tubular member crimped into the latter, a pipe connecting the upper ends of the heads, and a pipe connecting the lower ends of the heads.

2. A radiator of the class described comprising two vertical end heads and detachable upper and lower hollow end caps each formed with a lateral opening, the end heads having openings between the ports for the passage of air to cool the water passing through the ports, flat tubular members connecting the end heads to form a circuitous passage, a longitudinal re-enforcing rib in each tubular member and crimped into the latter, a pipe connecting and communicating with the lateral openings of the upper caps, a pipe connecting and communicating with the lateral openings of the lower caps, the end heads having openings adjacent the ends of the flat tubular members, and cover plates for closing the latter openings.

3. In a radiator of the class described, comprising two vertical heads having ports therein provided with inlet and outlet openings, tubular members rectangular in cross section extending between the two heads and each communicating with the inlet opening of one head and the outlet opening of the opposite head to form a circuitous passage, a pipe connecting the upper ends of the heads, a pipe connecting the lower ends of the heads, interior braces for the tubular members, a frame, and bolts connecting the frame and supporting the tubular members between the heads.

4. A radiator of the class described, comprising vertical heads formed with elongated ports having inlet and outlet openings formed partially by integral flanges and intermediate separate sections, flat tubular members having flared ends to communicate with the inlet openings of one head and the outlet openings of the companion head, means for securing the joints between the flat tubular members and the separate sections and the heads, a pipe connecting the upper ends of the heads, and a pipe connecting the lower ends of the heads.

5. A radiator of the class described comprising vertical heads, each having ports therein and openings adjacent thereto, flat tubular members connecting the ports in the heads, a longitudinal re-inforcing rib in each tubular member, crimped into the latter, plates for closing the openings, circulating pipes connecting the heads, braces extending across the front of the tubular members and the pipes, braces extending across the rear of the tubular members and the pipes and rods extending between the tubular members to connect the braces.

6. A radiator of the class described, comprising a frame, vertical heads within the frame, said heads having ports provided with inlets and outlets and openings in alignment therewith and at right angles thereto, bolts loosely passing through the right angularly disposed openings and fastened to the frame, tubular members rectangular in cross section and flared at their ends and communicating with the outlets of one head and the inlets of the opposite head, troughs interposed between the ends of adjacent tubular members and soldered thereto to partly form the inlets and outlets, the opposite ends of said members engaging and secured to flanges formed on the heads, detachable plates for covering the openings in line with the tubular members, caps secured to the top and bottom of the heads, a pipe connecting the upper caps, and a pipe connecting the lower caps.

7. A radiator comprising two vertical end heads and a central vertical head, the end heads having ports, each formed with an inlet and an outlet, the central vertical head having ports disposed on the opposite side of a medial line, each port having an inlet and an outlet opening, a series of tubular members rectangular in cross section and flared at the ends, the flared ends of the tubular members communicating with the inlet and outlet openings of the ports of opposite heads, pipes connecting the upper ends of the heads, a valve in the upper pipe to cut off communication with the tubular sections on one side of the central head, and a pipe connecting the lower ends of the two end heads.

8. A radiator comprising a pair of end heads formed with ports, each port having an inlet and an outlet, a center head having a plurality of ports, each of said latter ports having an inlet and outlet, a plurality of tubular members rectangular in cross section connecting the inlet ports of one head and the outlet ports of the adjacent head, a circulating pipe connecting the upper ends of the heads, a circulating pipe connecting the lower ends of the heads, and valves arranged to cut off the circulation through the tubular members on one side of the center head.

9. A radiator comprising end heads, each head having a plurality of ports, the head between the ports having inwardly extended tapered flanges formed with intermediate depressions, a trough fitted in each depression, a plurality of tubular members connecting the heads, each tubular member having its ends flared, the flared ends engaging the flanges and the edges of the troughs, solder for securing the ends of the troughs and the tubular members to the flanges to seal the joints and form inlets and outlets for the ports, solder connecting the adjacent edges of the tubular members directly to the flanges, and circulating pipes connecting the upper and lower ends of the heads.

10. A radiator of the class described, comprising a pair of vertical heads having ports provided with inlets and outlets, a plurality of tubular members rectangular in cross section connecting the inlets with the outlets, a plurality of bolts extending between the tubular members, a longitudinal reinforcing rib in each tubular member and disposed at right angles to the bolts, each rib being crimped in with the metal forming the tubular member and supported on the bolt directly thereunder, and circulating pipes connecting the upper and lower ends of the heads.

11. A radiator of the class described, comprising end heads each formed with ports and intervening air passages, the ports having inlet and outlet openings, a central head formed on opposite sides with ports, each having an inlet and outlet opening, the central head having air passages between the ports, flat tubular members extending between and connecting the outlet openings of the end heads and the inlet openings of the central head and the outlet openings of the central head and inlet openings of the end heads, whereby to form two circuitous passages, caps at the top and bottom of the end heads, pipes connecting the caps at the top of the heads, pipes connecting the caps at the bottom of the end heads, and means for bracing the tubular members and the pipes.

12. A radiator comprising end heads formed with ports and intervening air passages, a trough shape partition extending across each port to form inlet and outlet openings, the heads having bevelled flanges adjacent the top and bottom walls of the ports, flat tubular members, the ends of each which engage one of the flanges and one edge of a trough, means for securing the abutting edges of the troughs and the tubular members, a pipe connecting the upper ends of the heads, a pipe connecting the lower ends of the heads, and means for bracing the front and rear of the tubular members and the pipes.

13. A radiator comprising oppositely disposed heads, each formed with ports, each port having an inlet and an outlet opening, flat tubular members connecting the outlet openings of one head and inlet openings of the other head and the inlet openings of one head and the outlet openings of the other head, disposed means within each tubular member for bracing the top and bottom of same, front and rear braces for the flat tubular members, and rods connecting the front and rear braces, said rods forming the support for the bottoms of the tubular members and extending across the plane of the braces.

14. A radiator comprising a pair of end heads, a central head, each head having ports formed with inlet and outlet openings, flat tubular members connecting the inlet and outlet openings, a pipe connecting the top of the two end heads, a pipe connecting the lower ends of the two end heads, a flange extending from the central head, means connecting the flange and the top pipe to form a brace, a frame around the heads, and a connection adjacent the flange to fasten the central head to the frame.

In testimony whereof I affix my signature.

PAUL KUHNE.